United States Patent [19]

Hashimoto et al.

[11] 4,153,179

[45] May 8, 1979

[54] METHOD AND APPARATUS FOR SEPARATING WIRES

[75] Inventors: Makoto Hashimoto, Kaizuka; Yoshio Tomita, Amagasaki; Fumio Nagatsuna, Kawasaki; Masateru Hirose, Takarazuka; Shogo Tanno, Nishinomiya, all of Japan

[73] Assignee: Dainichi-Nippon Cables, Ltd., Amagasaki, Japan

[21] Appl. No.: 860,489

[22] Filed: Dec. 14, 1977

[30] Foreign Application Priority Data

Dec. 24, 1976 [JP] Japan .............................. 51-156701

[51] Int. Cl.² ............................................ B65H 1/06
[52] U.S. Cl. ........................................ 221/1; 221/204
[58] Field of Search .............. 221/200, 204, 209, 266, 221/263, 231, 217, 277, 187, 1

[56] References Cited

U.S. PATENT DOCUMENTS 3,151,747  10/1964  McGoogan ................... 221/217 X
3,310,301  3/1967  Netta et al. ................... 221/217 X Primary Examiner—Stanley H. Tollberg
Attorney, Agent, or Firm—W. G. Fasse; D. F. Gould

[57] ABSTRACT

A method and an apparatus useful for a group of wires, such as a telecommunication cable including a multiplicity of cores, as when the wires are individually tested for continuity or defective contact. The group of wires are pressed against the outer periphery of a rotating disc formed with a suitable number of notches each dimensioned to accommodate one wire and are forced into the notches one by one while the disc or the wires are being rocked longitudinally of the wires. The wires individually received in the notches are transferred by the rotation of the disc while being confined in the notches by a confining member provided around the disc and facing the outer periphery as slightly spaced apart therefrom. Thus the group of wires can be separated and transferred one after another reliably, efficiently and automatically.

11 Claims, 4 Drawing Figures

METHOD AND APPARATUS FOR SEPARATING WIRES

BACKGROUND OF THE INVENTION

1. Field of the Invention

This invention relates to a method and an apparatus for separating wires, and more particularly to a method and an apparatus suited to a group of wires, such as a telecommunication cable composed of numerous cores, for separating and transferring the group of wires one by one efficiently and automatically.

The wire separating method and apparatus of this invention are useful for example when a group of cores are individually separated and transferred for a continuity test or defective contact test as in the electrical test of telecommunication cables, or when an unknown number of grouped wires are checked for the accurate total number of the wires.

2. Description of the Prior Art

We have already obtained Japanese Pat. No. 578047, published Jan. 26, 1970, on a method and an apparatus for automatically individually separating a group of wires. The method and apparatus will be described below with reference to FIG. 1. The core group 1 of a telecommunication cable, for example, is placed into an inlet 7 and pressed against a rotary disc 3 having for example one notch 2 formed in its peripheral side face to force one core 6 into the notch 2 by a pressing member 4. The core 6 received in the notch 2 is sent forward by the rotation of the rotary disc 3 while being confined in the notch 2 by a holder block 5 provided around the rotary disc 3 and facing the peripheral side face as slightly spaced apart therefrom, and is released from the disc 3 at an outlet 9. Indicated at 5' is a block having a face 52' which, like the face 52 of the holder block 5, is opposed to the periphery of the rotary disc 3. The faces 52 and 52' are positioned close to the periphery of the rotary disc 3 and spaced apart therefrom by such a small distance that will not permit the core 6 to engage in the clearance between the disc periphery and the faces 52, 52'. The holder block 5 and block 5' have wall faces 51 and 51' respectively, defining the core inlet 7.

Since the core group 1 within the inlet 7 is held pressed by the pressing member 4 against the notched peripheral side face of the rotary disc 3 according to this method, the cores 6 can be forced into the notch 2 one at a time and separated and transferred one by one.

This method, however, has the drawback that the pressing member 4, although pressing the core goup 1 in the inlet 7 against the periphery of the rotary disc 3, sometimes fails to engage the core 6 into the notch 2. Such misengagement will take place when the pressure of the pressing member 4 on the core group 1 forms at the lower end of the inlet 7 a compacted arrangement of intimately fitting cores 6, with the resulting friction between the cores restraining the engagement of the core into the notch. Additionally, while the cores of group 1 in the inlet 7 are being separated and transferred one after another, a void 8 is likely to occur within the group 1, forming a bridge of cores in which the cores are arranged concentrically along the pressing surface of the pressing member 4 and along the inner wall faces 51, 51' defining the inlet 7. The pressing member 4 would then be unable to press the cores except those positioned close to the inner walls, giving rise to the tendency of the cores to retain their position against the pressure and enhancing the likelihood of misengagement. The phenomenon of misengagement also occurs when intersecting cores in the group 1 come into contact with the notched portion, since both the cores are unable to fully engage in the notch 2 at the same time.

To overcome these problems, we have proposed an improved wire separating method (Japanese patent application No. 50-15127, filed Feb. 7, 1975), in which a group of wires placed in a core inlet are separated while being subjected to a rocking motion perpendicular to the longitudinal direction of the group of wires, the rocking motion being imparted by an eccentric rotary disc disposed under a rotary disc of the same type as already described formed in its peripheral side face with a notch suitable for accommodating one core. The eccentric rotary disc is mounted at an eccentric portion thereof on the drive shaft of the notched rotary disc and rotated in synchronism therewith in such manner that the eccentric disc is out of contact with the group of cores when the notch of the notched disc is positioned in the inlet but comes into contact with the core group to press the cores at right angles to the longitudinal direction thereof when the notch is away from the inlet. The changes in the position of the periphery of the eccentric disc relative to the group of cores due to its rotation about its eccentric axis give the core group a repeated rocking motion perpendicular to the longitudinal direction thereof, thereby collapsing the compact arrangement, if any, of the cores at the lower end of the inlet or a bridge-like core arrangement to reduce the likelihood of the above-mentioned misengagement.

The improved method, however, is still unable to fully obviate such an objectionable core arrangement. When rocking the group of cores transversely thereof, it is difficult to afford a rocking motion of sufficient amplitude and therefore to ensure a satisfactory effect at all times in collapsing the undesirable arrangement of cores in the inlet. Moreover it is impossible, by the transverse rocking motion alone, to completely eliminate the misengagement of the core in the notch which takes place when an intersection of cores comes into contact with the notched portion as experienced in the case where the cores are stranded. In fact, difficulties are still encountered with the improved method in completely individually separating the cores of telecommunication cables because they are in the form of strands such as pair of quad strands and have many intersections between the cores.

The improved method has another disadvantage that the eccentric disc, which repeatedly gives a rocking motion to the group of cores always at the same position, is likely to cause damage to the insulating covers on cores of telecommunication cables by the repeated impact.

SUMMARY OF THE INVENTION

An object of this invention is to provide a method and an apparatus for separating a group of wires one by one automatically, efficiently and reliably without involving the aforementioned misengagement.

Another object of this invention is to provide a method and an apparatus for reliably separating a group of wires one by one even when the wires are in the form of pair or quad strands as in telecommunication cables.

These objects can be fulfilled by the method and apparatus of this invention for separating a group of wires by pressing the group of wires against movable means having at least one notch formed in a surface thereof to force a wire into the notch, the notch being so dimensioned as to accommodate one of the wires, and separating the wire from the group of remaining wires and transferring the same by the movement of the movable means while confining the wire in the notch by a confining member disposed close to the surface of the movable means in facing relation thereto, the method and the apparatus being characterized in that the movable means and the group of wires are rocked relative to each other longitudinally of the wires.

The foregoing and other objects of this invention as well as the features and advantages of the invention will become more apparent from the following detailed description given with reference to the accompanying drawings.

DESCRIPTION OF THE PREFERRED EMBODIMENTS

Figure 1:
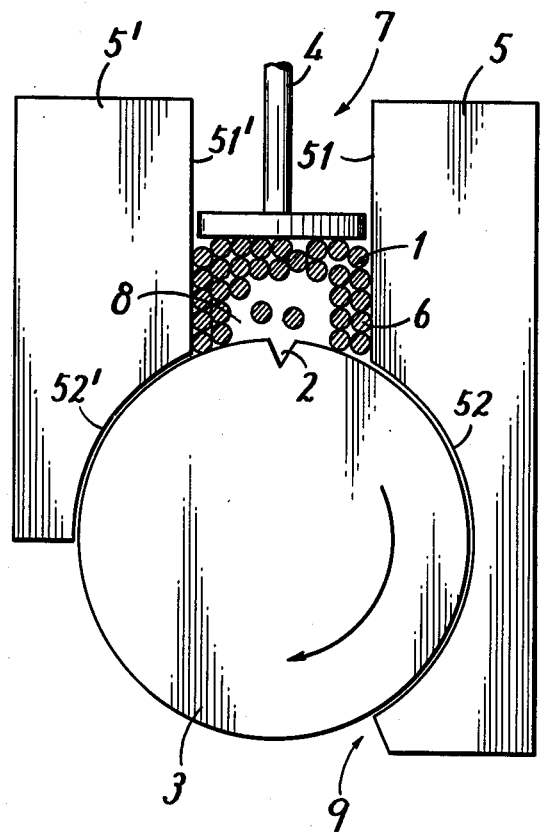
FIG. 1 is a diagram illustrating the operation of a wire separating apparatus over which this invention provides an improvement.
Figure 2:
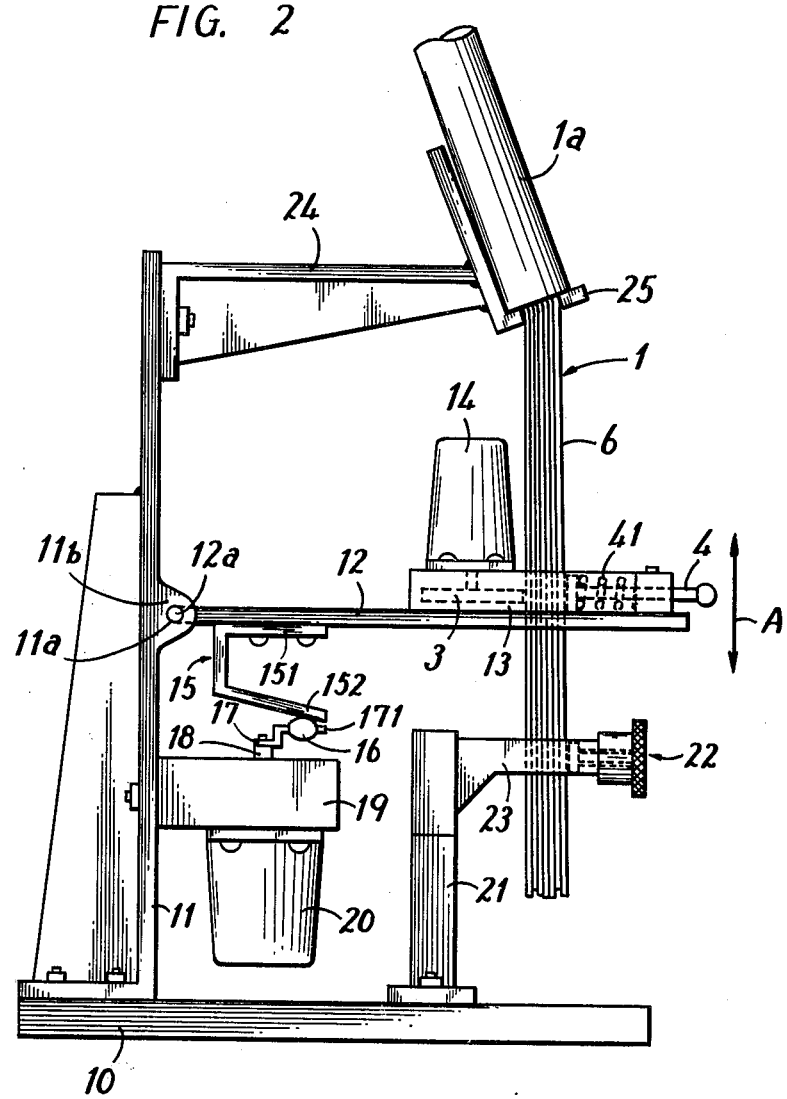
FIG. 2 is a perspective view showing an embodiment of the wire separating apparatus of this invention.

With reference to FIG. 2, a support 11 mounted on a base 10 is provided approximately at its midportion with a bracket 11b having a pin bore 11a. A table 12 for supporting a core separating and transferring assembly 13, has a pin 12a extending through the bore 11a and is accordingly turnable about the pin 12a. The core separating and transferring assembly 13, similar in construction to the apparatus shown in FIG. 1, includes a rotary disc 3 serving as movable means, holder block 5, block 5', pressing member 4, core inlet 7 and core outlet 9. The rotary disc 3, made for example of metal, ceramics or synthetic resin, is formed in its peripheral side surface with for example four V- or U-shaped notches equidistantly spaced apart circumferentially of the disc 3 and so dimensioned as to accommodate one core (e.g. 1 mm in diameter). The rotary disc 3 is driven by a motor 14. The pressing member 4 is adapted to be advanced in the pressing direction and retractable for example by a spring 41 incorporated therein so as to press a group of cores 6 in the inlet 7, against the peripheral side surface of the rotary disc 3. The table 12 has in the center of its forward end a cutout for passing a wire group 1 therethrough and thereby setting the wire group for the separating and transferring assembly 13. Disposed beneath the table 12 is a plate-like member 15 laterally U-shaped in section and including legs 151 and 152, with the leg 151 attached to the bottom of the table 12. The leg 152 is not in parallel to the leg 151 but is inclined. A motor 20 mounted on the support 11 is positioned below the plate-like member 15. The drive shaft of the motor 20 is coupled to a reduction gear 19 by which the rotation of the motor is reduced to a suitable speed and then delivered to a shaft 18 connected to a crank shaft 17. The crank shaft 17 carries a roller 16 freely rotatably mounted on its forward end 171. Accordingly the shaft 18, when driven by the motor 20, turns the crank shaft 17, with the result that the roller 16 horizontally revolves about the shaft 18 in contact with the surface of the leg 152 of the plate-like member 15. Since the leg 152 is inclined with the respect to the other leg 151 as already described, namely with respect to the surface of the table 12, the revolution of the roller 16 about the shaft 18 continuously rocks the table 12 about the pin 12a of the table 12 in the direction of the arrow A, i.e. longitudinally of the core group 1.

The support 11 has a horizontal support arm 24 attached to its top end and provided with a cable holder 25 at the free end of the arm 24. A multi-core cable 1a from which the core group 1 extends downward is fixedly held by the holder 25. A core group clamping member 22 on a horizontal support arm 23 of a vertical post 21 mounted on the base 10 fixedly holds a lower portion of the core group 1. Thus the core group 1 is fixed at positions above and below the rotary disc 3. Consequently whereas the table 12 rocks in the direction of the arrow A by virtue of the rotation of the motor 20, the core group 1 is held in a fixed position, so that the rotary disc 3 positioned in the core separating and transferring assembly 13 on the table 12 rocks longitudinally of the core group 1, shifting longitudinally of the core group 1 the position where the peripheral side surface thereof contacts the group.

According to the embodiment described above, the rotary disc, i.e. movable means, and the group of wires are rocked relative to each other longitudinally of the wires by rocking the rotary disc longitudinally of the wires with the group of wires held stationary.

Alternatively the relative rocking motion between the movable means and the group of wires can be effected by rocking the group of wires longitudinally thereof with the movable means retained in a fixed position. Since an embodiment will be described below with reference to FIGS. 3 and 4.

Figure 3:
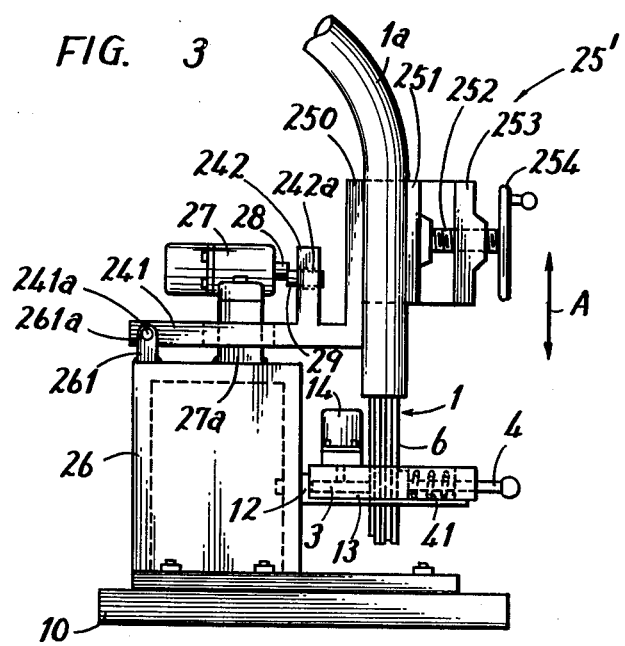
FIG. 3 is a perspective view showing another embodiment of the wire separating apparatus of this invention.

FIG. 3 shows a base 10 with a frame 26 installed thereon. The frame 26 is provided on its top with a bracket 261 having a pin bore 261a. A table 241 has a pin 241a extending through the bore 261a and is thereby made pivotally movable about the pin 241a. A holder 25' for clamping a cable 1a is connected to the front end of the table 241. The cable holder 25' comprises a cable casing member 250, cable pressing member 251, screw rod 252 connected to the cable pressing member, stationary plate 253 secured to the cable casing member 250 and in screw-thread engagement with the screw rod 252, and handle 254 connected to the screw rod 252. The handle 254, when turned, causes the cable casing member 250 and the cable pressing member 251 to hold the cable 1a in clamping engagement therewith.

Figure 4:
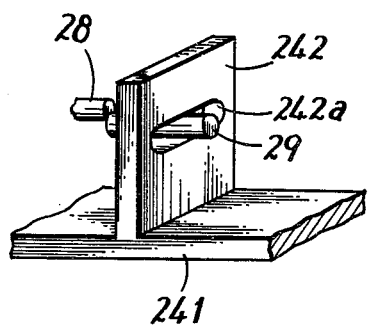
FIG. 4 is a diagram showing a principal part of FIG. 3.

A motor 27 is fixedly mounted on the frame 26 by a support 27a. The drive shaft 28 of the motor 27 extends into an eccentric rod 29 inserted into a rod aperture 242a formed in a plate 242 projecting from and secured to the table 241. The aperture 242a is in the form of a slot as seen in FIG. 4. The eccentric rod 29 at the front end of the shaft 28 rotates in the aperture 242a with the rotation of the motor 27, vertically moving the plate 242 but without moving the plate horizontally. As a result, the table 241 is moved up and down as indicated by the arrow A.

A table 12 supporting a core separating and transferring assembly 13 is secured at its one end to one side of the frame 26. The assembly 13, identical in construction to that of the foregoing embodiment, includes a rotary disc 3 driven by a motor 14.

With the construction described above, the motor 27, when driven, rotates the shaft 28 and rod 29, thereby vertically moving the plate 242 as indicated by the arrow A. Accordingly the cable holder 25 at the front end of the table 241 repeatedly continuously rocks in the direction of the arrow A along with the cable 1a, whereas the core separating and transferring assembly 13 remains stationary on the frame 26, with the result that the core group 1, while longitudinally rocking in itself, shifts the position of its contact with the peripheral side surface of the rotary disc 3 arranged in the assembly 13.

In the foregoing embodiments of FIGS. 2 and 3, the relative rocking motion between the movable means and the group of wires in the longitudinal direction of the wires has been described as being continuous motion afforded by the continuous rotation of the motor 20 or 27. However, the rocking motion may be effected intermittently by energizing and deenergizing the motor periodically. Furthermore, the movable member or the wire group may be held out of rocking motion for a period of time following the initiation of rotation of the movable means in which period the misengagement is less likely to take place and may thereafter be initiated into a rocking motion.

The rotary disc used as the movable means in the foregoing embodiments replaceable by an endless belt which is grooved in its surface.

According to the method and apparatus of this invention described above, a group of wires are automatically separated and transferred one by one while the movable means and the group of wires are being rocked relative to each other longitudinally of the wires. The invention therefore ensures a rocking motion of sufficiently great amplitude which effectively collapses the compact arrangement, if any, of intimately fitting wires in parallel rows or in the form of a bridge which would otherwise lead to the aforesaid misengagement. Additionally even when the wires are in the form of pair or quad strands, each wire can be forced into the notch at a portion other than where the wire intersects another wire. Because of these advantages, wires can be separated and transferred one after another efficiently and reliably.

What is claimed is:

1. A method of separating a group of wires by pressing the group of wires against movable means having at least one notch formed in a surface thereof to force the wires into the notch one at a time, and separating the wire in the notch from the group of remaining wires and transferring the same by the movement of the movable means while confining the wire in the notch by a confining member disposed along and close to the path of movement of the notch, the method being characterized in that the movable means and the group of wires are rocked relative to each other longitudinally of the wires.

2. A method as defined in claim 1 wherein the group of wires is fixed in place and the movable means is rocked longitudinally of the wires to rock the movable means and the group of wires relative to each other longitudinally of the wires.

3. A method as defined in claim 1 wherein the movable means is fixed against movement longitudinally of the wires and the wires are rocked to rock the movable means and the group of wires relative to each other longitudinally of the wires.

4. A method as defined in claim 1 wherein the movable means and the group of wires are continuously rocked relative to each other longitudinally of the wires.

5. A method as defined in claim 1 wherein the movable means and thr group of wires are intermittently rocked relative to each other longitudinally of the wires.

6. A method as defined in claim 1 wherein the movable means and the group of wires are brought into a rocking motion relative to each other longitudinally of the wires a desired period of time after the initiation of movemement of the movable means.

7. A method as defined in claim 1 wherein the movable means is a rotary disc having at least one notch formed in its peripheral side surface and dimensioned to accommodate one of the wires.

8. In an apparatus for separating a group of wires having movable means formed in a surface thereof with at least one notch dimensioned to accommodate one of the wires, a confining member and a block member disposed along and close to the path of movement of the notch and defining a wire group inlet and a wire outlet, and means provided at the inlet for pressing the group of wires, the improvement comprising an assembly for rocking the movable means and the group of wires relative to each other longitudinally of the wires.

9. An apparatus as defined in claim 8 wherein the assembly for rocking the movable means and the group of wires relative to each other longitudinally of the wires comprises means for fixing the group of wires above and below the movable means and means for rocking the movable means longitudinally of the wires.

10. An apparatus as defined in claim 8 wherein the assembly for rocking the movable means and the group of wires relative to each other longitudinally of the wires comprises means for holding the movable means in a fixed position and means for rocking the group of wires longitudinally of the wires.

11. An apparatus as defined in claim 8 wherein the movable means is a rotary disc having at least one notch formed in its peripheral side surface and dimensioned to accommodate one of the wires.

* * * * *

UNITED STATES PATENT OFFICE
CERTIFICATE OF CORRECTION

Patent No. 4,153,179      Dated May 8, 1979

Inventor(s) Makoto Hashimoto et al

It is certified that error appears in the above-identified patent and that said Letters Patent are hereby corrected as shown below:

Item [75] should read as follows:

--[75] Inventors: Makoto Hashimoto, Kaizuka-shi, Osaka-fu;
Yoshio Tomita, Amagasaki-shi, Hyogo-ken;
Fumio Nagatsuna, Kawasaki-shi, Kanagawa-ken;
Masateru Hirose, Takarazuka-shi, Hyogo-ken;
Shogo Tanno, Nishinomiya-shi, Hyogo-ken;

all of Japan.--

Also, in Claim 5, line 2, "thr" should be --the--;

and in Claim 6, line 5, "movemement" should be --movement--.

Signed and Sealed this

Twenty-fifth Day of September 1979

[SEAL]

Attest:

Attesting Officer

LUTRELLE F. PARKER
Acting Commissioner of Patents and Trademarks